United States Patent
Luo et al.

(10) Patent No.: US 8,566,416 B2
(45) Date of Patent: Oct. 22, 2013

(54) METHOD AND SYSTEM FOR ACCESSING STORAGE DEVICE

(71) Applicant: Huawei Technologies Co., Ltd., Guangdong (CN)

(72) Inventors: Rong Luo, Shenzhen (CN); Jiangtao Li, Shenzhen (CN); Kaitian Du, Shenzhen (CN); Peng Zhang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/716,461

(22) Filed: Dec. 17, 2012

(65) Prior Publication Data

US 2013/0110960 A1     May 2, 2013

Related U.S. Application Data

(63) Continuation of application No. PCT/CN2011/080115, filed on Sep. 23, 2011.

(51) Int. Cl.
*G06F 15/16*     (2006.01)
*G06F 15/167*     (2006.01)

(52) U.S. Cl.
USPC .......................................... 709/212; 709/203

(58) Field of Classification Search
USPC .................... 709/203, 212, 216; 711/202–203
See application file for complete search history.

(56) References Cited

U.S. PATENT DOCUMENTS

| | | | | |
|---|---|---|---|---|
| 7,043,622 | B2 * | 5/2006 | Henry et al. | 711/203 |
| 7,805,565 | B1 * | 9/2010 | Milligan et al. | 711/114 |
| 2003/0131207 | A1 * | 7/2003 | Arakawa et al. | 711/162 |
| 2003/0204701 | A1 * | 10/2003 | Mimatsu et al. | 711/203 |
| 2003/0236945 | A1 * | 12/2003 | Nahum | 711/114 |
| 2006/0242352 | A1 | 10/2006 | Torudbakken | |
| 2007/0239944 | A1 | 10/2007 | Rupanagunta | |
| 2008/0147959 | A1 | 6/2008 | Freimuth | |
| 2008/0270733 | A1 * | 10/2008 | Sakaguchi et al. | 711/173 |
| 2011/0082950 | A1 * | 4/2011 | Mine et al. | 710/36 |
| 2012/0233425 | A1 * | 9/2012 | Yueh | 711/162 |

FOREIGN PATENT DOCUMENTS

| | | |
|---|---|---|
| CN | 200987206 Y | 12/2007 |
| CN | 101196852 A | 6/2008 |
| CN | 101299757 A | 11/2008 |
| CN | 101345630 A | 1/2009 |
| CN | 101593144 A | 12/2009 |
| KR | 20020071375 A | 9/2002 |

OTHER PUBLICATIONS

Search report and Written Opinion issued in corresponding PCT application No. PCT/CN2011/080115, dated Jun. 28, 2012, total 17 pages.

Search report issued in corresponding European application No. 11864748.6,dated Feb. 26, 2013,total 6 pages.

* cited by examiner

*Primary Examiner* — Joshua Joo

(74) *Attorney, Agent, or Firm* — Huawei Technologies Co., Ltd.

(57) ABSTRACT

In a subrack with multiple boards, in order to enable a server board and at least one client board of the multiple boards to access a same storage device, an embodiment server board acquires, physical information of at least one physical storage device. Then the server board sends a client board the physical information to enable the client board to establish a virtue storage device and receives a first request for accessing the virtual storage device sent from the client board. The server board convertes the first request for accessing the virtual storage device into a second request for accessing the physical storage device, and sends the second request for accessing the physical storage device to a storage controller connected to the physical storage device in order to enable the storage controller to send relevant data to the client.

12 Claims, 3 Drawing Sheets

METHOD AND SYSTEM FOR ACCESSING STORAGE DEVICE

This application is a continuation application of International Patent Application No. PCT/CN2011080115, filed Sep. 23, 2011, which is hereby incorporated by reference in their entirety.

FIELD OF THE INVENTION

The present invention relates to the field of data storage technologies, and in particular, to a method and a system for accessing a storage device.

BACKGROUND OF THE INVENTION

At present, there are generally multiple boards in one subrack. Each board has an independent operating system, and the boards are connected with each other via a bus. The operating system accesses a storage device through a hard disk controller, and generally the hard disk controller can only be controlled and managed by one operating system, so that the operating system of each board can only access one storage device. Because the operating system on each board can only access one storage device, the operating system on each board cannot access storage devices corresponding to other boards, so that multiple operating systems cannot access stored data in a same storage device.

SUMMARY OF THE INVENTION

Embodiments of the present invention provide a method, an apparatus and a system for accessing a storage device, to solve the problem existing in the prior art that an operating system on each board can only access a storage device corresponding to the board. Through the embodiments of the present invention, that multiple operating systems access stored data in a same storage device may be achieved.

In order to achieve the foregoing object, the embodiments of the present invention adopt the following technical solutions:

In a subrack with multiple boards, in order to enable a server board and at least one client board of the multiple boards to access a same storage device, a method for accessing a storage device, executed by the server board, comprises acquiring, physical information of at least one physical storage device; sending, the physical information to a client board through a communication interface in order to enable the client board to establish a virtual storage device corresponding to the physical storage device according to the physical information; receiving, a first request for accessing the virtual storage device sent from the client board; converting, the first request for accessing the virtual storage device into a second request for accessing the physical storage device; and sending, the second request for accessing the physical storage device to a storage controller connected to the physical storage device in order to enable the storage controller to send relevant data to the client board according to the second request for accessing the physical storage device.

In a subrack, a multi-board system for enabling a server board and at least one client board to access a same storage device, the multi-board system comprises: a server board configured to acquire physical information of at least one physical storage device; send the physical information to a client board through a communication interface; receive a first request for accessing the virtual storage device sent from the client board; convert the first request for accessing the virtual storage device into a second request for accessing the physical storage device; and send the second request for accessing the physical storage device to a storage controller connected to the physical storage device; the client board configured to establish a virtual storage device corresponding to the physical storage device according to the physical information received; send the first request for accessing the virtual storage device to the server board; and receive relevant data from the physical storage device; and the storage controller configured to receive the second request for accessing the physical storage device; and send relevant data to the client board according to the physical storage device access request.

In the method and system for accessing a storage device provided by the embodiments of the present invention, the client board establishes a corresponding virtual storage device according to the physical information of the physical storage device acquired by the server board, and the server board converts the virtual storage device access request of the client board to obtain the physical storage device access request that may be processed by the storage controller, so that multiple client boards can access the data in the physical storage device through the server board, thereby achieving that operating systems on multiple boards access storage data in the same storage device; in addition, the client board may receive, in the DMA direct memory access manner, the data sent by the controller, so that the data does not need to be processed by a CPU of a server when being transmitted to a client, thereby achieving a high performance operation of the system.

BRIEF DESCRIPTION OF THE DRAWINGS

To illustrate the technical solutions in the embodiments of the present invention or in the prior art more clearly, the following briefly describes the accompanying drawings needed for describing the embodiments or the prior art. Apparently, the accompanying drawings in the following descriptions merely show some embodiments of the present invention, and persons skilled in the art may derive other drawings from the accompanying drawings without creative efforts.

DETAILED DESCRIPTION OF THE EMBODIMENTS

The following clearly describes the technical solutions according to the embodiments of the present invention with reference to the accompanying drawings in the embodiments of the present invention.

Embodiment 1

Figure 1:
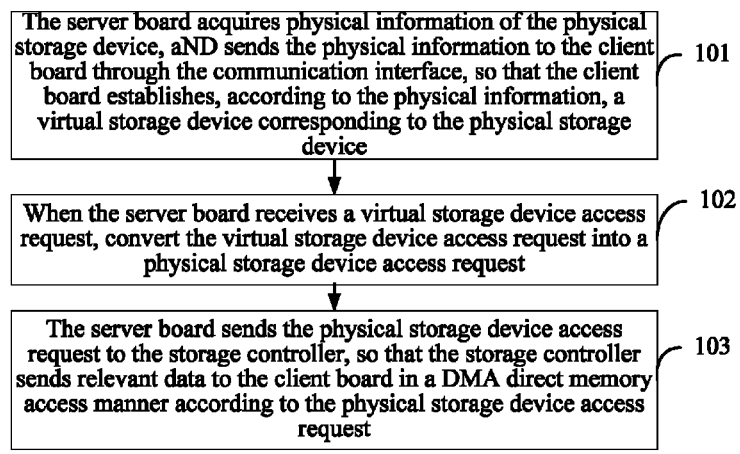
FIG. 1 is a flow chart of a method for accessing a storage device in Embodiment 1 of the present invention.

An embodiment of the present invention provides a method for accessing a storage device, applied to a multi-board system. Where the board system includes a server board and a client board. The "board" here is a physical PCB (Printed Circuit Board, printed circuit board) inserted into a device slot, and one of the boards may be selected to serve as the server board, while the other boards serve as client boards. The server board and the client board each is set with an independent operating system. The server board and the client board communicate with each other through a communication interface and implement communication with a storage controller through the communication interface. Where the communication interface may be a PCIe (Peripheral Component Interconnect Express, peripheral component interconnect express) bus. The storage controller is connected to a physical storage device to send data in the physical storage device to the server board or the client board; an address of a memory of the client board is mapped into the server board, so that the server board is capable of accessing the memory of the client board. As shown in FIG. 1, the method includes:

101. The server board acquires physical information of the physical storage device, and sends the physical information to the client board through the communication interface, so that the client board establishes, according to the physical information, a virtual storage device corresponding to the physical storage device.

102. When the server board receives a virtual storage device access request, convert the virtual storage device access request into a physical storage device access request.

103. The server board sends the physical storage device access request to the storage controller, so that the storage controller sends relevant data to the client board in a direct sending manner according to the physical storage device access request.

In the method and system for accessing a storage device provided by the embodiment of the present invention, the client board establishes a corresponding virtual storage device according to the physical information of the physical storage device acquired by the server board. The server board converts the virtual storage device access request of the client board into the physical storage device access request which can be processed by the storage controller, so that multiple client boards can access the data in the physical storage device through the server board, thereby achieving that operating systems on multiple boards access storage data in the same storage device; in addition, the client board may receive, in the DMA direct memory access manner, the data sent by the controller, so that the data does not need to be processed by a CPU of a server when being transmitted to a client, thereby achieving a high performance operation of the system.

Embodiment 2

Based on Embodiment 1, another embodiment of the present invention is illustrated in detail through an example where the storage device is a hard disk, the storage controller is a hard disk controller, and the communication interface between the server board and the client board is a PCIe (PCI Express) interface. Implementation manners based on other storages or communication interfaces may be implemented on the basis of the embodiment of the present invention and in combination with specific features of other storages (such as SD, secure digital memory card, secure digital memory card) or communication interfaces, these specific implementation manners are technologies well known to persons skilled in the art, and these implementation manners are not described in detail in the embodiment of the present invention.

Figure 2:
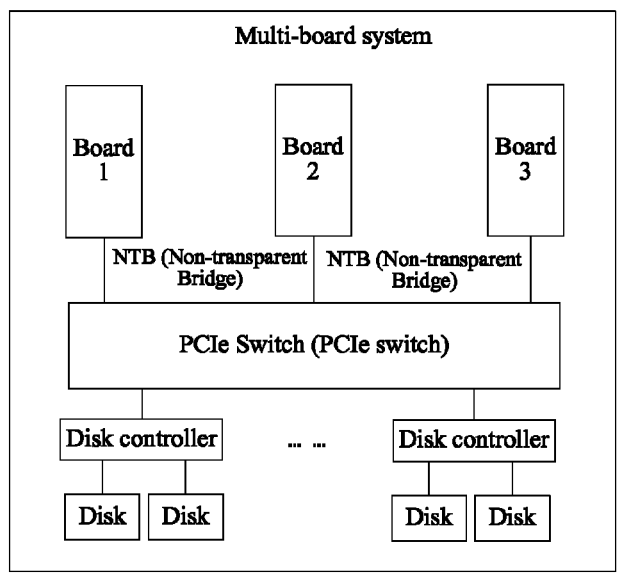
FIG. 2 is a schematic structural diagram of a multi-host system in Embodiment 2 of the present invention.

FIG. 2 is a schematic structural diagram of an application scenario of the embodiment of the present invention, including a board 1, a board 2, a board 3, a PCIe Switch (PCIe switch), a hard disk controller, and a hard disk. Where the board 1 is a server board, the board 2 and the board 3 are client boards, more boards may exist in practice, and here 3 boards are taken as an example for illustration.

The PCIe Switch is configured to implement data access of each board to other boards, and may be considered as a channel for the data access between the boards. In a specific implementation, the PCIe Switch may be implemented by using a dedicated physical chip. A port (such as Upstream Link Port of a PEX 8648 chip) with a certain configuration function of the chip is connected to a control chip of the server board to implement configuration of the PCIe Switch. Where specific configuration includes allocation of bus numbers, allocation of device numbers, allocation of address spaces, and so on. In general, a node connected to the port with the certain configuration function of the chip is called "ROOT (root) node", and the server board in the embodiment of the present invention may be considered as a ROOT node. Other ports of the chip are connected to each board to transmit PCIe signals, and these connection technologies are technologies known to persons skilled in the art, and are not described in detail here. The chip implementing the PCIe Switch function may be set on the server board, or may be set on an independent board. For convenient illustration in FIG. 2, the PCIe Switch is shown in the drawing as a separate functional module.

In the embodiment of the present invention, the board 2 and the board 3 are connected to the PCIe Switch in a NTB (Non-transparent Bridge, non-transparent bridge) manner. In a specific implementation, if a PCIe interface supported by a processing chip on a board may be configured as a NT mode, the PCIe interface is configured with the NT mode to implement the NTB. The processing chip on the board may further be externally connected to a chip supporting the NT mode of the PCIe interface or similar functions (for example, further externally connected to a PCIe Switch supporting the NT mode). So as to implement the NTB; or, if the number of client boards is not large and the PCIe Switch in the embodiment of the present invention also has a port supporting the NT mode (generally, the PCIe Switch does not have too many ports of this type), the NTB connection may also be implemented by using the PCIe Switch.

Through the NTB connection, address mapping for each client board may be implemented. More specifically, the address space of each client board may be mapped to the server board, so that the server board is able to access the address space of each client board by using a mapped address. For example, it is assumed that the access address of each board is 0-4G Byte, the address space of the board 2 may be mapped to 10G-14G Byte in the board 1 through mapping, and the address space of the board 3 may be mapped to 20G-24G Byte in the board 1; in this way, if the board 1 intends to access the 0-4G Byte address of the board 2, the board 1 only needs to access the address space 10G-14G Byte thereof. Through address mapping, the centralized management of storage addresses of all client boards may be implemented on the server board.

According to the size of needed storage capacity, the PCIe Switch may be connected to one or more hard disk controllers. In some occasions with large service traffic, the PCIe Switch is generally connected to multiple hard disk controllers, and one or more hard disks may exist under each hard disk controller. The hard disk controller is configured to receive and interpret signals sent by a processor (in the embodiment the signals are transferred through a PCIe bus), and send various control signals to the hard disks, thereby achieving the access of the processor to each hard disk.

Figure 3:
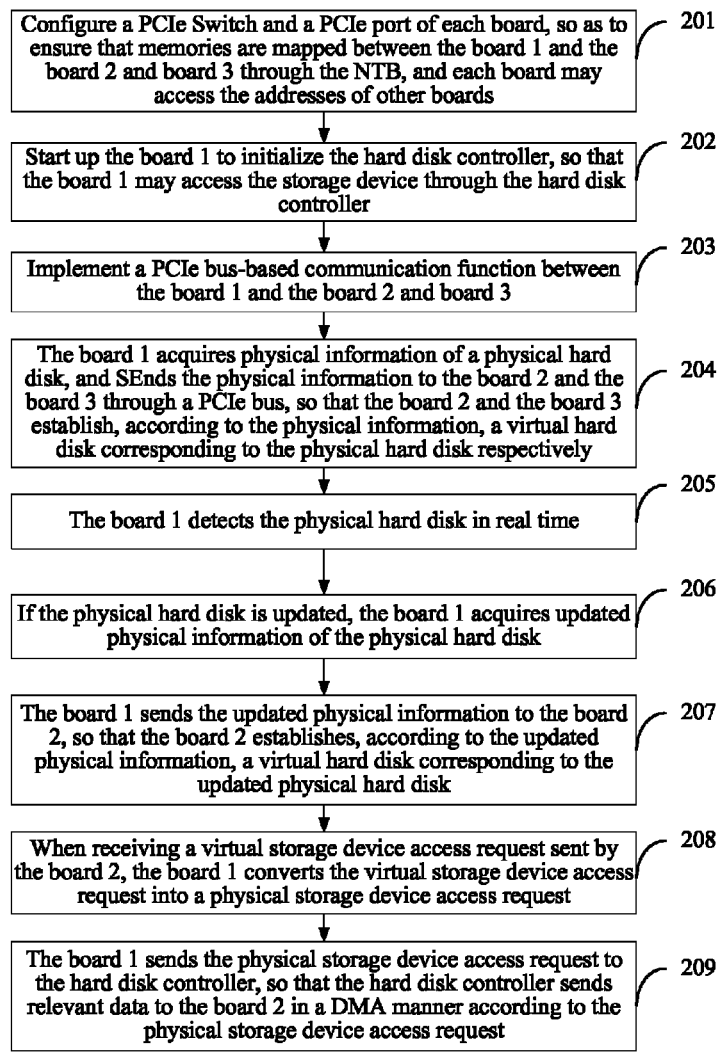
FIG. 3 is a flow chart of a method for accessing a storage device in Embodiment 2 of the present invention.

As shown in FIG. 3, the method for accessing a storage device based on the foregoing architecture includes the following steps:

201. Configure a PCIe Switch and a PCIe port of each board, so as to ensure that memories are mapped (sometimes called "memories are isolated") between the board 1, the board 2, and board 3 through the NTB. And each board may access the addresses of other boards (for example, the board 2 may access the addresses of the board 1 and the board 3).

It should be noted that if some boards do not need to access the addresses of other boards (for example, the board 2 only needs to access the address of itself, and does not need to access the addresses of other boards), the addresses of the board 1 and the board 3 may not be mapped to the board 2. The address mapping may be implemented through an NTB connection, and the specific implementation method related to the NTB is a technology known to persons skilled in the art, and is not be described in detail here.

202. Start up the board 1 and initialize the hard disk controller, so that the board 1 may access the storage device through the hard disk controller.

The initialization of the hard disk controller is completed by a driver stored in the hard disk controller, and coding of the driver is a technology known to persons skilled in the art, and is not be described in detail here.

203. Implement a PCIe bus-based communication function between the board 1, the board 2, and board 3.

The implementation of the PCIe bus-based communication function between the board 1, the board 2, and the board 3 is configured by the operating systems on the board 1, the board 2, and the board 3. The configuration by the operating systems is a technology known to persons skilled in the art, and is not being described in detail here.

204. The board 1 acquires physical information of a physical hard disk, and sends the physical information to the board 2 and the board 3 through a PCIe bus, so that the board 2 and the board 3 establish, according to the physical information, a virtual hard disk corresponding to the physical hard disk respectively.

The physical information includes information about a name of the physical hard disk, capacity of the physical hard disk and a sector number of the physical hard disk.

It should be noted that the establishing, by the board 2 and the board 3 and according to the physical information, a virtual hard disk corresponding to the physical hard disk respectively may be implemented in the following manner, which specifically is:

receiving, by the board 2 and the board 3, the physical information, and establishing, according to parameters related to the physical hard disk in the physical information, a virtual hard disk identical to the physical hard disk in the operating systems on the board 2 and the board 3 respectively. Where the virtual storage device does not store real data and is only configured to provide virtual addresses that have one-to-one correspondence with data storage addresses in the physical hard disk. The virtual addresses do not exceed an address range accessible by the client board. The technology of establishing a virtual hard disk is a technology known to persons skilled in the art, and generally operating systems (such as Linux and Windows) may provide a similar interface for establishing a virtual storage device (or, which may be coded by a user by utilizing a known technology). In the embodiment of the present invention, as long as the physical information is transferred to the interface, the operating system can complete the establishment of a virtual storage device, and the specific implementation method thereof is not described in detail in the embodiment of the present invention.

205. The board 1 detects the physical hard disk in real time.

206. If the physical hard disk is updated, the board 1 acquires updated physical information of the physical hard disk.

207. The board 1 sends the updated physical information to the board 2, so that the board 2 establishes, according to the updated physical information, a virtual hard disk corresponding to the updated physical hard disk.

208. When receiving a virtual storage device access request sent by the board 2, the board 1 converts the virtual storage device access request into a physical storage device access request.

It should be noted that step 208 may be implemented in the following manner, which specifically is:

converting, by the board 1, a destination address, which is in the virtual storage device access request and used for accessing the virtual storage device, into a destination address used when the hard disk controller accesses the physical storage device and serve as a physical storage device access request.

For example, the access destination address in the virtual storage device access request of the board 2 is a space address 0x8000 in a hard disk D of the virtual hard disk, the board 1 replaces the space address 0x8000 in the hard disk D of the virtual hard disk with a space address 0xF000 in a hard disk B of the physical hard disk, and carries the space address 0xF000 in the hard disk B of the physical hard disk in the virtual storage device access request. Therefore the physical storage device access request is obtained. These conversion technologies may be implemented based on the NTB connection and PCIe Switch that are described above, and are not described in detail here.

209. The board 1 sends the physical storage device access request to the hard disk controller, so that the hard disk controller sends relevant data to the board 2 in a DMA direct memory access manner according to the physical storage device access request.

Figure 4:
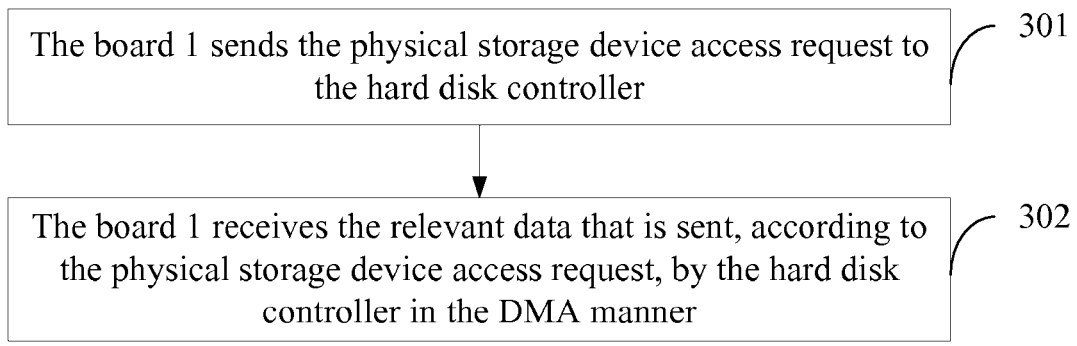
FIG. 4 is a flow chart of another method for accessing a storage device in Embodiment 2 of the present invention.

It should be noted that the board 1 may directly process the physical storage device access request, and as shown in FIG. 4, the method further includes:

301. The board 1 sends the physical storage device access request to the hard disk controller.

302. The board 1 receives the relevant data that is sent, according to the physical storage device access request, by the hard disk controller in the DMA direct memory access manner.

In this embodiment, the server board may also process the access request processed by the client board, so that operating systems on multiple boards may access the same storage device, which can be achieved without providing special hardware devices, thereby reducing the cost.

In the method and system for accessing a storage device provided by the embodiments of the present invention, the client board establishes a corresponding virtual storage device according to the physical information of the physical storage device acquired by the server board, and the server board converts the virtual storage device access request of the client board to obtain the physical storage device access request that may be processed by the storage controller, so that multiple client boards can access the data in the physical storage device through the server board, thereby achieving that operating systems on multiple boards access storage data in the same storage device; in addition, the client board may receive, in the DMA direct memory access manner, the data sent by the controller, so that the data does not need to be processed by a CPU of a server when being transmitted to a client, thereby achieving a high performance operation of the system.

Embodiment 3

Figure 5:
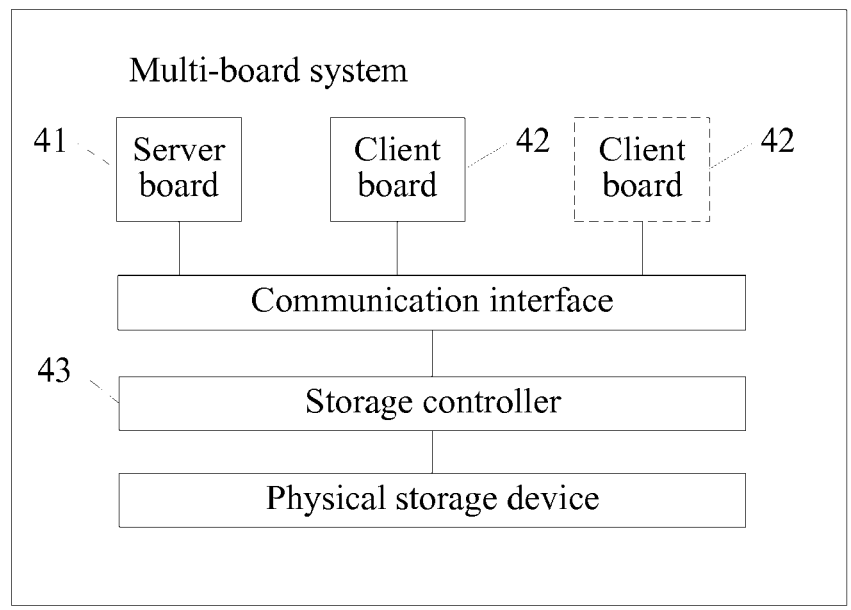
FIG. 5 is a block diagram of a system for accessing a storage device in Embodiment 3 of the present invention.

The embodiment of the present invention provides a multi-board system, as shown in FIG. 5. The system includes a server board 41 and one or more client boards 42. Where the server board 41 and the client boards 42 communicate with each other through a communication interface and implement communication with a storage controller 43 through the communication interface. The storage controller 43 is connected to a physical storage device to send data in the physical storage device to the server board 41 or the client boards 42. An address of a memory of the client boards 42 are mapped into the server board 41, so that the server board 41 is capable of accessing the memory of the client board 42.

The server board 41 is configured to acquire physical information of the physical storage device, and send the physical information to the client boards 42 through the communication interface. The server board 41 is further configured to convert a virtual storage device access request into a physical storage device access request when receiving the virtual storage device access request, and send the physical storage device access request to the corresponding storage controller 43.

The physical information is information including a name of the physical storage device, capacity of the physical storage device and a sector number of the physical storage device.

The client board 42 is configured to receive the physical information sent by the server board 41. And establish, according to the physical information, a virtual storage device corresponding to the physical storage device, and further configured to send the virtual storage device access request to the server board 41 when the virtual storage device needs to be accessed.

The storage controller 43 is configured to receive the physical storage device access request sent by the server board 41, and send relevant data to the client board 42 according to the physical storage device access request.

Furthermore, the server board 41 is further configured to detect the physical storage device in real time, and if the physical storage device is updated, the server board 41 acquires updated physical information of the physical storage device, and sends the updated physical information to the client board 42, so that the client board 42 establishes, according to the updated physical information, a virtual storage device corresponding to the updated physical storage device.

Furthermore, the server board is further configured to send the physical storage device access request to the storage controller 43, and receive the relevant data that is sent, according to the physical storage device access request, by the storage controller 43 in the DMA direct memory access manner.

In the system for accessing a storage device provided by the embodiments of the present invention, each of the client boards establishes a corresponding virtual storage device according to the physical information of the physical storage device acquired by the server board. The server board converts the virtual storage device access request of the client board to the physical storage device access request that may be processed by the storage controller, so that multiple client boards can access the data in the physical storage device through the server board. Operating systems on multiple boards are able to access stored data in the same storage device. In addition, the client board may receive, in the DMA direct memory access manner, the data sent by the controller, so that the data does not need to be processed by a CPU of a server when being transmitted to a client, thereby achieving a high performance operation of the system.

Through the above description of the embodiments, it is clear to persons skilled in the art that the present invention may be accomplished by software plus necessary universal hardware, and definitely may also be accomplished by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of a computer, and includes several instructions for instructing a computer device (which may be a personal computer, a server, a network device, and the like) to execute the methods described in the embodiments of the present invention.

The foregoing descriptions are merely several embodiments of the present invention, but not intended to limit the present invention. Any variation or replacement made by persons skilled in the art without departing from the spirit of the present invention should fall within the protection scope of the present invention. Therefore, the protection scope of the present invention shall be subject to the protection scope of the claims.

The invention claimed is:

1. A method for providing shared access to a storage device for a client board and a server board located in a subrack and each of the client board and the server board running an independent operating system, the method comprising:
   acquiring, by the server board, at least one storage device parameter of a physical storage device;
   sending, by the server board, the storage device parameter to the client board;
   establishing, by the client board according to the storage device parameter, a virtual storage device corresponding to the physical storage device;
   receiving, by the server board, a first request for accessing the virtual storage device sent by the client board;
   converting, by the server board, the first request for accessing the virtual storage device into a second request for accessing the physical storage device;
   sending, by the server board, the second request for accessing the physical storage device to a storage controller operating the physical storage device; and
   receiving, by the client board, relevant data from the physical storage device sent by the storage controller according to the second request.

2. The method according to claim 1, wherein the storage device parameter comprises a name of the physical storage device, capacity of the physical storage device, and a sector number of the physical storage device.

3. The method according to claim 1, wherein the server board sends the second request for accessing the physical storage device to the storage controller via a Peripheral Component Interconnect Express (PCIe) bus.

4. The method according to claim 1, wherein the storage controller sends the relevant data to the client board in a Direct Memory Access (DMA) manner.

5. The method according to claim 1, wherein the method further comprises:
   detecting, by the server board, that the physical storage device is updated;
   acquiring, by the server board, an updated storage device parameter of the updated physical storage device; sending, by the server board, the updated storage device parameter to the client board; and establishing, by the client board according to the updated storage parameter, a virtual storage device corresponding to the updated physical storage.

6. The method according to claim 1, wherein the step of converting comprises:

replacing a first destination address included in the first request for accessing the virtual storage device with a second destination address included in the second request for accessing the physical storage device.

7. A system for providing shared storage access, comprising a client board, a server board, a storage controller, and a physical storage device located in a subrack, each of the server board and the client board set with an independent operating system;

the server board being configured to acquire at least one storage device parameter of the physical storage device, and send the storage device parameter to the client board;

the client board being configured to establish a virtual storage device corresponding to the physical storage device according to the storage device parameter;

the server board being further configured to receive a first request for accessing the virtual storage device sent from the client board; convert the first request for accessing the virtual storage device into a second request for accessing the physical storage device; and send the second request for accessing the physical storage device to a storage controller connected to the physical storage device; and the client board being further configured to receive relevant data from the physical storage device sent by the storage controller according to the second request.

8. The system according to claim 7, wherein the storage device parameter comprises a name of the physical storage device, capacity of the physical storage device, and a sector number of the physical storage device.

9. The system according to claim 7, wherein the server board sends the second request for accessing the physical storage device to the storage controller via a Peripheral Component Interconnect Express (PCIe) bus.

10. The system according to claim 7, wherein the storage controller sends relevant data to the client board in a Direct Memory Access (DMA) manner.

11. The system according to claim 7, wherein the server board is further configured to detect that the physical storage device is updated; based upon the detection, acquire an updated storage device parameter of the updated physical storage device; and send the updated storage device parameter to the client board; and the client board is further configured to establish according to the updated storage parameter a virtual storage device corresponding to the updated physical storage device.

12. The system according to claim 7, wherein the server board is configured to convert the first request for accessing the virtual storage device into a second request for accessing the physical storage by replacing a first destination address included in the first request for accessing the virtual storage device with a second destination address included in the second request for accessing the physical storage device.

* * * * *